United States Patent
Hicks et al.

(10) Patent No.: US 9,870,354 B2
(45) Date of Patent: Jan. 16, 2018

(54) USE OF TEMPORARY OPTIMIZED SETTINGS TO REDUCE CYCLE TIME OF AUTOMATICALLY CREATED SPREADSHEETS

(71) Applicant: International Business Machines Corporation, Armonk, NY (US)

(72) Inventors: Scott D. Hicks, Underhill Center, VT (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 14/539,219

(22) Filed: Nov. 12, 2014

(65) Prior Publication Data

US 2015/0089343 A1  Mar. 26, 2015

Related U.S. Application Data

(63) Continuation of application No. 11/674,268, filed on Feb. 13, 2007, now Pat. No. 8,904,340.

(51) Int. Cl.
*G06F 17/00* (2006.01)
*G06F 17/24* (2006.01)
*G06F 17/30* (2006.01)

(52) U.S. Cl.
CPC ...... *G06F 17/246* (2013.01); *G06F 17/30899* (2013.01)

(58) Field of Classification Search
CPC .................. G06F 17/30899; G06F 17/246
See application file for complete search history.

(56) References Cited

U.S. PATENT DOCUMENTS

| | | |
|---|---|---|
| 5,737,599 A | 4/1998 | Rowe et al. |
| 5,781,785 A | 7/1998 | Rowe et al. |
| 6,014,516 A | 1/2000 | Nishiumi |
| 7,010,779 B2 | 3/2006 | Rubin et al. |
| 7,096,082 B1 * | 8/2006 | Connelly ............ G06Q 10/0635 700/104 |
| 7,146,644 B2 | 12/2006 | Redlich et al. |
| 7,225,189 B1 | 5/2007 | McCormack et al. |

(Continued)

OTHER PUBLICATIONS

U.S. Appl. No. 11/674,268, Notice of Allowance and Fees Due Jul. 18, 2014.

(Continued)

*Primary Examiner* — Stephen Hong
*Assistant Examiner* — Marshon Robinson
(74) *Attorney, Agent, or Firm* — Lisa Ulrich; Hoffman Warnick LLC

(57) ABSTRACT

Aspects of the present invention provide a solution for reducing cycle time of automatically created spreadsheets. Specifically, an embodiment of the present invention provides a way to create a spreadsheet from data that is in a native format more quickly and/or efficiently. To do so, the invention accesses a control file using optimized settings to create the spreadsheet. Then, after creation of the spreadsheet, the invention uses a second control file having the final settings to modify the spreadsheet in preparation for output. The invention may use agents to perform all or a portion of these activities.

20 Claims, 3 Drawing Sheets

(56) References Cited

U.S. PATENT DOCUMENTS

| | | | |
|---|---|---|---|
| 7,246,313 B2* | 7/2007 | Sung | G06F 17/24 |
| | | | 715/202 |
| 7,421,648 B1 | 9/2008 | Davis | |
| 7,703,010 B2 | 4/2010 | Bernstein et al. | |
| 8,365,138 B2* | 1/2013 | Iborra | G06F 8/30 |
| | | | 717/104 |
| 2002/0059278 A1 | 5/2002 | Bailey et al. | |
| 2002/0059339 A1 | 5/2002 | McCormick et al. | |
| 2002/0161799 A1 | 10/2002 | Maguire et al. | |
| 2003/0005341 A1 | 1/2003 | Terunuma | |
| 2003/0014443 A1 | 1/2003 | Bernstein et al. | |
| 2003/0106040 A1* | 6/2003 | Rubin | G06F 8/30 |
| | | | 717/106 |
| 2003/0222918 A1 | 12/2003 | Coulthard | |
| 2003/0226105 A1 | 12/2003 | Waldau | |
| 2004/0056894 A1 | 3/2004 | Zaika | |
| 2004/0107179 A1 | 6/2004 | Dalrymple et al. | |
| 2004/0107401 A1 | 6/2004 | Sung et al. | |
| 2004/0133568 A1* | 7/2004 | Witkowski | G06F 17/246 |
| 2004/0194019 A1 | 9/2004 | Mast et al. | |
| 2004/0210445 A1* | 10/2004 | Veronese | G06F 8/10 |
| | | | 705/1.1 |
| 2004/0255238 A1* | 12/2004 | Bushel | G06F 17/246 |
| | | | 715/213 |
| 2005/0050442 A1 | 3/2005 | Pope et al. | |
| 2005/0071755 A1 | 3/2005 | Harrington et al. | |
| 2005/0081148 A1 | 4/2005 | Deganello et al. | |
| 2006/0015806 A1* | 1/2006 | Wallace | G06F 17/246 |
| | | | 715/229 |
| 2006/0036939 A1 | 2/2006 | Hobbs et al. | |
| 2006/0085386 A1* | 4/2006 | Thanu | G06F 17/246 |
| 2006/0095833 A1* | 5/2006 | Orchard | G06F 17/246 |
| | | | 715/209 |
| 2006/0206240 A1 | 9/2006 | Tsui | |
| 2006/0218488 A1* | 9/2006 | Shah | G06F 17/211 |
| | | | 715/210 |
| 2006/0248071 A1 | 11/2006 | Campbell et al. | |
| 2007/0006072 A1 | 1/2007 | Purvis | |
| 2007/0022128 A1* | 1/2007 | Rothschiller | G06F 17/246 |
| 2007/0061698 A1 | 3/2007 | Megiddo et al. | |
| 2007/0150443 A1 | 6/2007 | Bergholz et al. | |
| 2007/0165284 A1 | 7/2007 | Li et al. | |
| 2007/0186166 A1* | 8/2007 | Anderson | G06F 17/30056 |
| | | | 715/730 |
| 2008/0046803 A1 | 2/2008 | Beauchamp et al. | |
| 2008/0134018 A1* | 6/2008 | Kembel | G06F 17/30899 |
| | | | 715/234 |
| 2008/0172608 A1* | 7/2008 | Patrawala | H04L 67/02 |
| | | | 715/255 |
| 2008/0174806 A1* | 7/2008 | Singh | G06F 17/30011 |
| | | | 358/1.15 |
| 2009/0113088 A1 | 4/2009 | Illowsky et al. | |
| 2010/0269035 A1* | 10/2010 | Meyer | G06F 9/4446 |
| | | | 715/234 |
| 2010/0275222 A1* | 10/2010 | Wallace | G06F 17/246 |
| | | | 719/331 |
| 2011/0173314 A1 | 7/2011 | McQuarrie et al. | |
| 2013/0104191 A1* | 4/2013 | Peled | G06F 21/10 |
| | | | 726/1 |

OTHER PUBLICATIONS

U.S. Appl. No. 11/674,268, Office Action dated Apr. 10, 2014.
U.S. Appl. No. 11/674,268, Office Action dated Sep. 13, 2013.
U.S. Appl. No. 11/674,268, Office Action dated Dec. 20, 2012.
U.S. Appl. No. 11/674,268, Office Action dated May 25, 2012.
U.S. Appl. No. 11/674,268, Office Action dated Jan. 9, 2012.
U.S. Appl. No. 11/674,268, Office Action dated Jul. 12, 2011.
U.S. Appl. No. 11/674,268, Office Action dated Jan. 21, 2011.

* cited by examiner

US 9,870,354 B2

USE OF TEMPORARY OPTIMIZED SETTINGS TO REDUCE CYCLE TIME OF AUTOMATICALLY CREATED SPREADSHEETS

FIELD OF THE INVENTION

Aspects of the present invention generally relate to generation of spreadsheets. Specifically, aspects of the present invention provide a solution for using temporary optimized settings to more efficiently generate automatically created spreadsheets.

BACKGROUND OF THE INVENTION

In the business world of today, conversion of data from one format to another is a common practice. This is because, while one person may be able to and be comfortable with viewing data in a native format (e.g., in a database), others may be much more familiar with another format, such as a spreadsheet. To facilitate this, applications have been developed to automatically convert native data into alternative formats.

However, conversion of data in native formats into alternative formats is not always a trivial process. To this extent, a conversion of this sort may involve a significant number of steps, which may involve numerous processes and/or calculations. As such, conversion of data in native formats into alternative formats may take a considerable amount of time, especially if the conversion must be performed on a regular basis (e.g., daily). This reduces the ability of the resources doing the conversion to perform other tasks and decreases overall efficiency.

In view of the foregoing, there exists a need for a solution that overcomes one or more of the shortcomings of the prior art.

SUMMARY OF THE INVENTION

In general, aspects of the present invention provide a solution for reducing cycle time of automatically created spreadsheets. Specifically, an embodiment of the present invention provides a way to create a spreadsheet from data that is in a native format more quickly and/or efficiently. To do so, the invention accesses a control file using optimized settings to create the spreadsheet. Then, after creation of the spreadsheet, the invention uses a second control file having the final settings to modify the spreadsheet in preparation for output. The invention may use agents to perform all or a portion of these activities.

A first aspect of the present invention provides a method for reducing cycle time of automatically created spreadsheets, comprising: obtaining a first control document having optimized settings for the spreadsheet; setting the optimized settings; creating the spreadsheet using the optimized settings; obtaining a second control document having final settings for the spreadsheet; setting the final settings; and outputting the created spreadsheet.

A second aspect of the present invention provides a system for automatically creating a spreadsheet, comprising: an optimized settings obtainer for obtaining a first control document having optimized settings for the spreadsheet; an optimized settings setter for setting the optimized settings; a spreadsheet creator for creating the spreadsheet using the optimized settings; a final settings obtainer for obtaining a second control document having final settings for the spreadsheet; a final settings setter setting the final settings; and an outputter for outputting the created spreadsheet.

A third aspect of the present invention provides a program product stored on a computer readable medium for automatically creating a spreadsheet, the computer readable medium comprising: program code for obtaining a first control document having optimized settings for the spreadsheet; program code for setting the optimized settings; program code for creating the spreadsheet using the optimized settings; program code for obtaining a second control document having final settings for the spreadsheet; program code for setting the final settings; and program code for outputting the created spreadsheet.

A fourth aspect of the present invention provides a method for deploying a system for automatically creating a spreadsheet, comprising: providing a computer infrastructure being operable to: obtain a first control document having optimized settings for the spreadsheet; set the optimized settings, create the spreadsheet using the optimized settings; obtain a second control document having final settings for the spreadsheet; set the final settings; and output the created spreadsheet.

A fifth aspect of the present invention provides computer software embodied in a propagated signal for automatically creating a spreadsheet, the computer software comprising instructions for causing a computer system to perform the following: obtain a first control document having optimized settings for the spreadsheet; set the optimized settings, create the spreadsheet using the optimized settings; obtain a second control document having final settings for the spreadsheet; set the final settings; and output the created spreadsheet.

A sixth aspect of the present invention provides a method for automatically creating a spreadsheet, the method comprising managing a computer infrastructure that performs the process described herein; and receiving payment based on the managing.

Therefore, the present invention provides a method, system, and program product for automatically creating a spreadsheet.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the present invention provide a solution for reducing cycle time of automatically created spreadsheets. Specifically, an embodiment of the present invention provides a way to create a spreadsheet from data that is in a native format more quickly and/or efficiently. To do so, the invention accesses a control file using optimized settings to create the spreadsheet. Then, after creation of the spreadsheet, the invention uses a second control file having the final settings to modify the spreadsheet in preparation for output. The invention may use agents to perform all or a portion of these activities.

Figure 1:
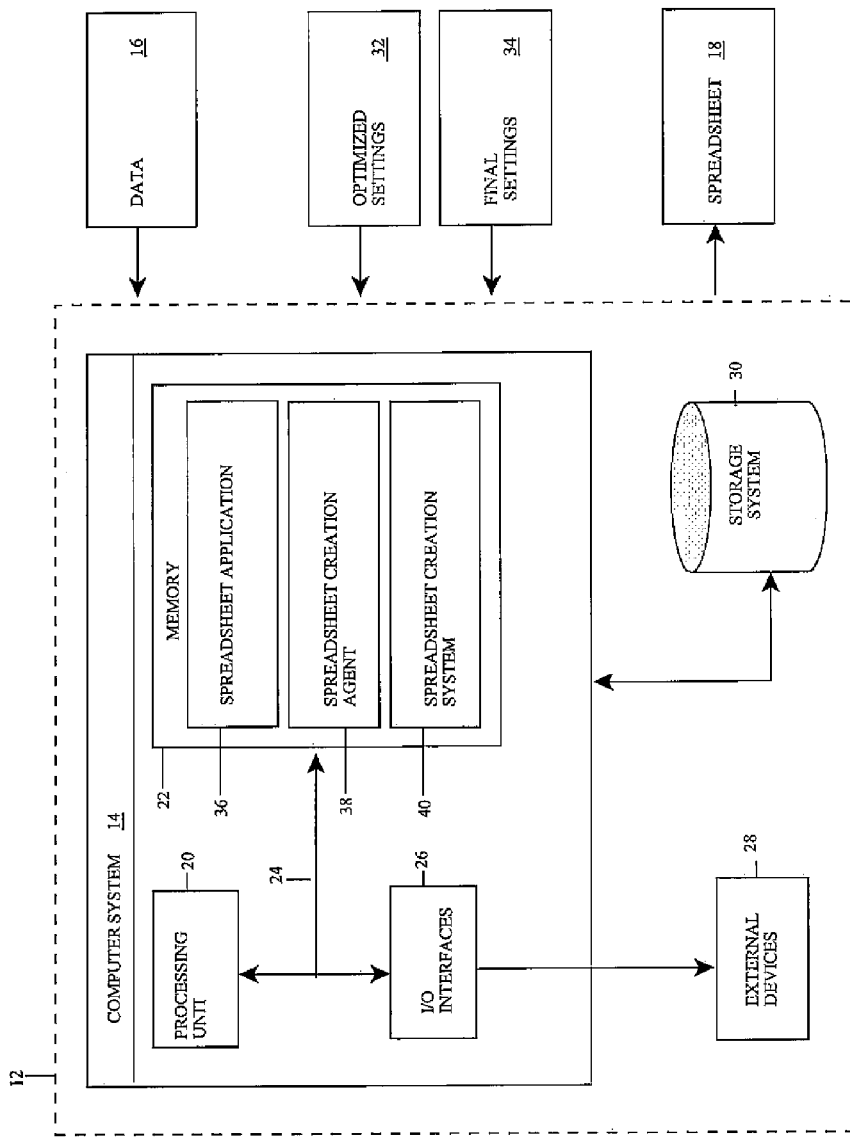
FIG. 1 shows an illustrative computer infrastructure for creating a workflow that defines a business process according to an embodiment of the present invention.

Referring now to FIG. 1, a system for automatically creating a spreadsheet according to an embodiment of the present invention is shown. Specifically, FIG. 1 depicts a system 10 in which data 16 in a native format may be more efficiently and/or quickly converted into a format of a spreadsheet 18. This is performed by initially applying a set of optimized settings 32 to create the spreadsheet and then using a set of final settings 34 to prepare the spreadsheet 18 for output.

As depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by a conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to for create a workflow that defines a business process.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as a spreadsheet creation system 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the process of the invention. Moreover, computer system 14 is only representative of various possible computer systems that can include numerous combinations of hardware and/or software. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention. For example, storage system 30 may be used to store data 16, optimized settings 32, final settings 34 and/or spreadsheet 18, among other things. In addition, storage system 30 may be used to store one or more spreadsheet creation agents 38 that may be used for performing the functions of this invention. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is a spreadsheet application 36, spreadsheet creation agent 38 and spreadsheet creation system 40, which are software programs that provides the functions of the present invention. Spreadsheet application 36 comprises any application used to create a spreadsheet 18 and/or to access data in the format of spreadsheet 18. Such applications may include, but not be limited to Microsoft EXCEL® (EXCEL is a trademark of Microsoft Corporation of Redmond, Wash. in the United States, other countries, or both), LOTUS 123® (LOTUS are 123 are trademarks of International Business Machines Corp. of Armonk, N.Y. in the United States and/or other countries), OPENOFFICE.ORG CALC® (OPENOFFICE.ORG is a trademark of Team OpenOffice.org e.V. of Hamburg, Germany in the United States and/or other countries), or the like. Spreadsheet creation agent 38 includes one or more pieces of software that act on behalf of spreadsheet creation system 40 to perform the tasks thereof. To this extent, spreadsheet creation agent 38 may be scheduled by spreadsheet creation system 40 to run at a predetermined time, may wait for a particular event before activating itself and/or may be activated by spreadsheet creation system 40. Spreadsheet creation agent 38 may be managed in any manner in which agents may be managed.

Figure 2:
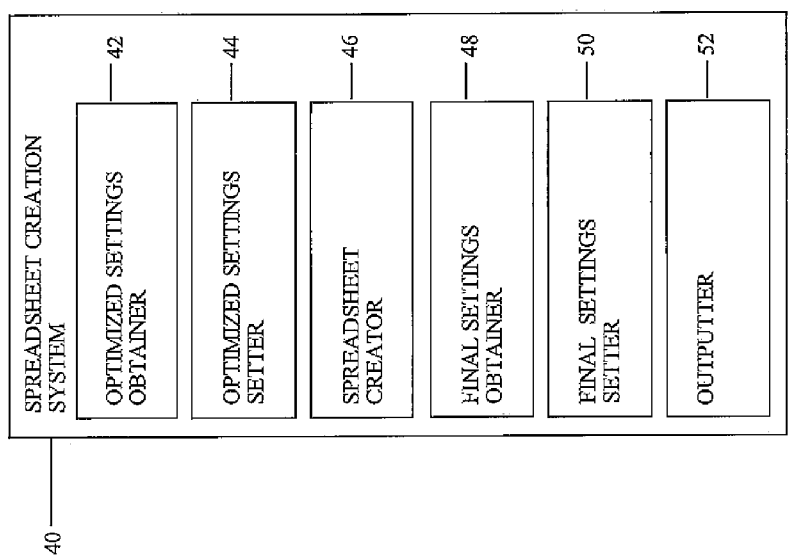
FIG. 2 shows an illustrative computer infrastructure for creating a workflow that defines a business process according to an embodiment of the present invention.

Referring now to FIGS. 1 and 2 concurrently, spreadsheet creation system 40 provides a system for creating a spreadsheet 18 that is more efficient and/or requires less cycle time. To this extent, spreadsheet creation system 40 includes an optimized settings obtainer 42, an optimized settings setter 44, a spreadsheet creator 46, a final settings obtainer 48, a final settings setter 50 and an outputter 52.

Optimized settings obtainer 42 obtains optimized settings 32 for creation of spreadsheet 18. Optimized settings 32 enable spreadsheet 18 to be created with a minimum of extraneous activity. For example, one of optimized settings 32 may be to turn off a default option in spreadsheet application 36 that automatically saves spreadsheet 18 for auto recovery purposes. Another of optimized settings 32 may be to disable a default option in spreadsheet application 36 that automatically calculates formulas in spreadsheet 18. Yet still another of optimized settings 32 may be to disable a default option in spreadsheet application 36 that automatically performs background error checking. It should be understood that these examples are not meant in anyway to be limiting of possible optimized settings that may be implemented. To this extent, any change to the functionality, interface, etc., of spreadsheet application 36, especially those that disable non-essential background activities, are envisioned.

In any event, optimized settings 32 may be obtained from a control file and/or from any source now known or later developed, such as hard coding. In the case that optimized settings 32 are obtained from a control file, the control file may be an Excel Pre-Creation Settings control document (generically, a pre-creation settings control document). In addition, optimized settings 32 may be obtained through the use of spreadsheet creation agent 38.

Optimized settings setter 44 sets optimized settings 32 in spreadsheet 18. This may be thought of as preparing spreadsheet 18 for addition of data 16 by applying optimized settings 32 to spreadsheet 18. The setting of optimized settings by optimized settings setter 44 may include calls to the object linking and embedding (OLE) class library of spreadsheet application 36, or, in the alternative, by any process that is now known or later developed for making alterations to settings in a spreadsheet application. Optimized settings setter 44 may also use spreadsheet creation agent for setting optimized settings 32 in spreadsheet 18.

Spreadsheet creator 46 creates spreadsheet 18 using optimized settings 12. Specifically, spreadsheet creator 46 converts data 16 from a natural format, e.g., that of a database, into spreadsheet 18 in the format of spreadsheet application 36. This creation is performed while optimized settings 12 are applied to spreadsheet 18 and/or spreadsheet application 36. For example, assume that optimized settings 12 include settings that disable automatic saving, automatic calculation, and background error checking Spreadsheet creator 46 may then create spreadsheet 18 without the delays that would be caused by the saves, calculations and/or refreshes normally provided by the disabled default functions, saving time and/or resources. Spreadsheet creator 46 may also use spreadsheet creation agent 38 for creating spreadsheet 18 from data 16.

Final settings obtainer 48 obtains final settings 34 that will be used in the final version of spreadsheet 18. Final settings 34 restore all or a portion of the functions that have been disabled and/or modified with the settings of optimized settings 32. To this extent, final settings 34 prepare spreadsheet 18 for output. For example, one of final settings 18 may be to restore the default options in spreadsheet application 36 that automatically save spreadsheet 18 for auto recovery purposes, automatically calculate formulas in spreadsheet 18, and automatically perform background error checking.

In any event, final settings 34 may be obtained from a control file and/or from any source now known or later developed, such as hard coding. In the case that final settings 34 are obtained from a control file, the control file may be an Excel Post-Creation Settings control document (generically, a post-creation settings control document). In addition, final settings 34 may be obtained through the use of spreadsheet creation agent 38.

Final settings setter 50 sets final settings 34 in spreadsheet 18. This may be thought of as preparing spreadsheet 18 for output. For example, the resetting of defaults of spreadsheet application 36 via final settings 34 to enable autosaving, automatic calculation, and background error checking allow these functions to be performed once after all data 16 has been entered into spreadsheet 18, and not numerous times while data 16 is being entered. The setting of final settings 34 by final settings setter 50 may include calls to the OLE class library of spreadsheet application 36, or, in the alternative, by any process that is now known or later developed for making alterations to settings in a spreadsheet application. Final settings setter 50 may also use spreadsheet creation agent for setting final settings 34 in spreadsheet 18.

Outputter 52 outputs spreadsheet 18 using final settings 14. Forms of output performed by outputter include, but are not limited to saving in storage system 30, transmittal to external devices 28, or any other form of outputting a spreadsheet now known or later developed.

Figure 3:
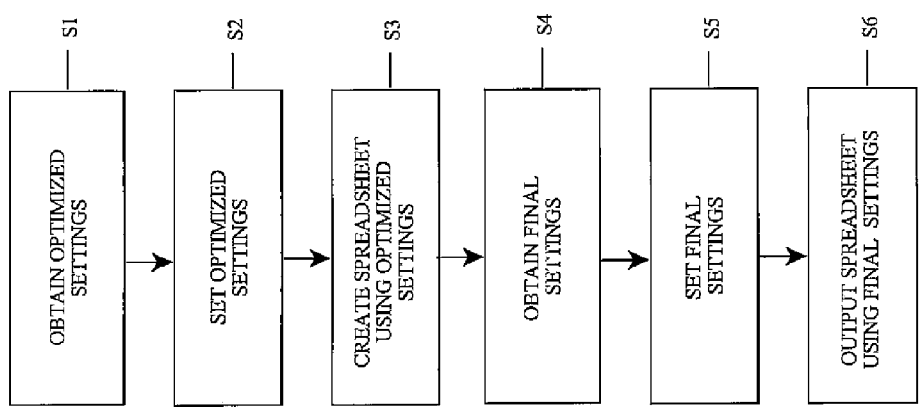
FIG. 3 shows an illustrative method flow diagram according to one embodiment of the present invention.

Turning now to FIG. 3, a flow chart of a method according to an embodiment of the present invention is depicted, which is described with reference to FIGS. 1 and 2. In process 51, optimized settings obtainer 42 obtains a first control document having optimized settings 32. The control document from which optimized settings 32 are obtained may be an Excel Pre-Creation Settings Control document. In process S2, optimized settings setter 44 sets optimized settings 32 in spreadsheet 18. Optimized settings 32 may be set via calls to the OLE class library. In process S3, spreadsheet creator 46 creates spreadsheet 18 using optimized settings 32. In process S4, final settings obtainer 48 obtains a second control document having final settings 34 for spreadsheet 18. The control document from which final settings 34 are obtained may be an Excel Post-Creation Settings Control document. In process S5, final settings setter 50 sets final settings 34 in spreadsheet 18. Final settings 34 may be set via calls to the OLE class library. In process S6, spreadsheet 18 having final settings 34 set is outputted using outputter 52.

While shown and described herein as a method and system for creating a workflow that defines a business process, it is understood that the invention further provides various alternative embodiments. For example, in one embodiment, the invention provides a computer-readable/useable medium that includes computer program code to enable a computer infrastructure to create a workflow that defines a business process. To this extent, the computer-readable/useable medium includes program code that implements the process of the invention. It is understood that the terms computer-readable medium or computer useable medium comprises one or more of any type of tangible embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer a service for creating a workflow that defines a business process. In this case, the service provider can create, maintain, support, etc., a computer infrastructure, such as computer infrastructure 12 (FIG. 1) that performs the process of the invention for one or more entities. In return, the service provider can receive payment from the entity(s) under a subscription and/or fee agreement and/or the service provider can receive payment from the sale of advertising content to one or more third parties.

In still another embodiment, the invention provides a computer-implemented method for creating a workflow that defines a business process. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for reducing cycle time of automatically created spreadsheets, comprising:
    obtaining a first control document having optimized settings for the spreadsheet, wherein the optimized settings include: disabling automatic saving, automatic calculation, and background error checking;
    optimizing a spreadsheet application by applying the optimized settings to the spreadsheet application;
    creating the spreadsheet by importing data from a source document different from the control document in a natural format that is different from a format of the spreadsheet into the spreadsheet using the optimized settings in the spreadsheet application;
    obtaining a second control document having final settings for the spreadsheet;
    setting the final settings; and
    outputting the created spreadsheet.

2. The method of claim 1, wherein the control document is a pre-creation settings control document.

3. The method of claim 1, wherein the second control document is a post-creation settings control document.

4. The method of claim 1, wherein the optimized settings are set via calls to an optimized settings class library.

5. The method of claim 1, wherein the final settings are set via calls to an optimized settings class library.

6. The method of claim 1, wherein the processes are performed by an agent.

7. A system for automatically creating a spreadsheet, comprising:
    an optimized settings obtainer for obtaining a first control document having optimized settings for the spreadsheet, wherein the optimized settings include: disabling automatic saving, automatic calculation, and background error checking;
    an optimized settings setter that optimizes a spreadsheet application by applying the optimized settings to the spreadsheet application;
    a spreadsheet creator for creating the spreadsheet by importing data from a source document different from the control document in a natural format that is different from a format of the spreadsheet into the spreadsheet using the optimized settings in the spreadsheet application;
    a final settings obtainer for obtaining a second control document having final settings for the spreadsheet;
    a final settings setter for setting the final settings; and
    an outputter for outputting the created spreadsheet.

8. The system of claim 7, wherein the first control document is a pre-creation settings control document.

9. The system of claim 7, wherein the second control document is a post-creation settings control document.

10. The system of claim 7, wherein the optimized settings are set via calls to an optimized settings class library.

11. The system of claim 7, wherein the final settings are set via calls to an optimized settings class library.

12. The system of claim 7, wherein the systems perform their tasks using at least one agent.

13. A program product stored on a non-transitory computer readable medium for automatically creating a spreadsheet, the computer readable medium comprising:
    program code for obtaining a first control document having optimized settings for the spreadsheet, wherein the optimized settings include: disabling automatic saving, automatic calculation, and background error checking;
    program code for optimizing a spreadsheet application by applying the optimized settings to the spreadsheet application;
    program code for creating the spreadsheet by importing data from a source document different from the control document in a natural format that is different from a format of the spreadsheet into the spreadsheet using the optimized settings in the spreadsheet application;
    program code for obtaining a second control document having final settings for the spreadsheet;
    program code for setting the final settings; and
    program code for outputting the created spreadsheet.

14. The program product of claim 13, wherein the control document is an pre-creation settings control document.

15. The program product of claim 13, wherein the second control document is a post-creation settings control document.

16. The program product of claim 13, wherein the optimized settings are set via calls to an optimized settings class library.

17. The program product of claim 13, wherein the final settings are set via calls to an optimized settings class library.

18. The program product of claim 13, wherein the program code performs its tasks using at least one agent.

19. A method for deploying a system for automatically creating a spreadsheet, comprising:
   providing a computer infrastructure being operable to:
      obtain a first control document having optimized settings for the spreadsheet, wherein the optimized settings include: disabling automatic saving, automatic calculation, and background error checking;
      optimize a spreadsheet application by applying the optimized settings to the spreadsheet application,
      create the spreadsheet by importing data from a source document different from the control document in a natural format that is different from a format of the spreadsheet into the spreadsheet using the optimized settings in the spreadsheet application;
      obtain a second control document having final settings for the spreadsheet;
      set the final settings; and
      output the created spreadsheet.

20. The method of claim 19, wherein the method performs its tasks by using at least one agent.

\* \* \* \* \*